US012808401B2

(12) United States Patent
Chen

(10) Patent No.: US 12,808,401 B2
(45) Date of Patent: Nov. 24, 2026

(54) DRIVE CONFIGURATION

(71) Applicant: ESSENCE METHOD REFINE CO., LTD., Tainan City (TW)

(72) Inventor: Jin-Sun Chen, Tainan City (TW)

(73) Assignee: ESSENCE METHOD REFINE CO., LTD., Tainan City (TW)

( * ) Notice: Subject to any disclaimer, the term of this patent is extended or adjusted under 35 U.S.C. 154(b) by 262 days.

(21) Appl. No.: 18/801,975

(22) Filed: Aug. 13, 2024

(65) Prior Publication Data

US 2026/0049631 A1 Feb. 19, 2026

(51) Int. Cl.
*F16B 23/00* (2006.01)
*B25B 15/00* (2006.01)

(52) U.S. Cl.
CPC .......... *F16B 23/003* (2013.01); *B25B 15/001* (2013.01); *F16B 2200/10* (2018.08)

(58) Field of Classification Search
CPC .. F16B 23/003; F16B 2200/10; B25B 15/001; B25B 15/005
See application file for complete search history.

(56) References Cited

U.S. PATENT DOCUMENTS 3,584,667 A * 6/1971 Reiland .................. F16D 1/101 81/460
4,512,220 A 4/1985 Barnhill, III et al.
4,970,922 A * 11/1990 Krivec .................. B25B 15/005 81/460
5,019,080 A * 5/1991 Hemer ............... A61B 17/8615 606/305
5,291,811 A * 3/1994 Goss ..................... F16B 23/003 411/404
5,461,952 A * 10/1995 Goss ..................... F16B 23/003 411/404
9,962,759 B2 * 5/2018 Chen ..................... F16B 23/003
11,759,918 B2 9/2023 Kukucka et al.
11,897,099 B2 2/2024 Kukucka et al.
2009/0003967 A1 * 1/2009 Luna ..................... B25B 15/005 411/404

(Continued)

FOREIGN PATENT DOCUMENTS

TW M503486 U 6/2015
TW I614416 B 2/2018

(Continued)

*Primary Examiner* — Nicholas L Foster
(74) *Attorney, Agent, or Firm* — Rosenberg, Klein & Lee

(57) ABSTRACT

A drive configuration is formed on a fastening assembly which includes two working units. The drive configuration includes a plurality of operating regions and a plurality of driving regions. An engagement region is formed between every two adjacent operating regions. A fitting region is formed between every two adjacent driving regions. Either the surface of the engagement region or the surface of the fitting region forms a three-section arc structure which includes three arc walls. When two arc walls of the three-section arc structure of one working unit come into contact with a single arc wall of the other working unit, two engagement points are formed when each engagement region engages with each fitting region, thereby attaining a stable engagement, applying torque efficiently, and allowing a one-handed operating mode for ease of using the fastening assembly.

18 Claims, 10 Drawing Sheets

(56) References Cited

U.S. PATENT DOCUMENTS

| | | | | |
|---|---|---|---|---|
| 2016/0245325 | A1* | 8/2016 | Chen | F16B 23/003 |
| 2017/0095909 | A1* | 4/2017 | Chen | B25B 15/005 |
| 2018/0003241 | A1* | 1/2018 | Goss | B25B 15/004 |
| 2020/0238482 | A1 | 7/2020 | Goss | |

FOREIGN PATENT DOCUMENTS

| | | | |
|---|---|---|---|
| TW | I621784 | B | 4/2018 |
| TW | 202242270 | A | 11/2022 |
| TW | 202317329 | A | 5/2023 |

* cited by examiner

DRIVE CONFIGURATION

BACKGROUND OF THE INVENTION

1. Field of the Invention

This invention relates to a screw fastener assembly and relates particularly to a drive configuration formed on a fastening assembly, and the fastening assembly includes a driving tool and a screw.

2. Description of the Related Art

Generally, there are various screw head sockets for fitting driving tools, such as a slotted socket, a cross-shaped socket, a cruciform socket with four radial indentations, square sockets, and a hexalobular socket. In terms of the hexalobular socket having a six-point pattern formed with six internal lobes alternating with six external lobes, the socket of the head is usually perpendicular to a driving tool so that the driving tool can apply torque to the socket for rotating the head. For example, a prior art is disclosed by the patent literature no. TW202242270A filed in Taiwan. FIG. 7 and FIG. 8 of this prior art show that a head includes a standard socket with six lobular recesses adapted to fit a driver with six lobes. The recesses and the driver have respective vertical walls. A clearance is formed between the recesses and the driver, which allows the driver to be easily inserted into the recesses. However, the axis of the driver deviates from a central axis of the head easily, and the deviation causes the driver to wobble from side to side easily and causes the plastic deformation of the recesses. In this case, the recesses are easily broken, and the driver escapes from the head easily.

Another prior art, the patent literature no. TWM503486U filed in Taiwan, is disclosed to improve the external arcuate structure, namely six external lobes. FIG. 2, FIG. 3, and FIG. 8 of this prior art disclose a socket portion recessedly formed in a head of a screw. The socket portion includes a drive socket with a conical bottom and a plurality of drive regions formed around the drive socket. Particularly, the socket portion has a structure which is wide at the top and narrow at the bottom and forms an inclination arrangement based on a specific slope and a specific angle difference. Each drive region has an end wall, a pair of opposing side walls, and a connecting wall. The end wall is connected to the side walls to define a groove communicating with the drive socket, so this groove is deemed to be an external lobular contour. The connecting wall is extended between a side wall of one drive region and a side wall of the other adjacent drive region, so the connecting wall is deemed to be an internal lobular contour. When the user inserts a driver into the socket portion, the driver reaches a surface portion near the conical bottom of the drive socket. The drive regions also touch the driver so that the connecting wall can be in surface contact with the driver. When there are six connecting walls, six engagement points in total are created when the engagement occurring between the head and the driver is fulfilled. Accordingly, the driver applies torque to the head for rotating the screw.

Generally, the head is processed by a surface treatment, and the surface treatment is executed by centrifugal force for coating a surface of the head with a coating. The method of forming the coating includes immersing the head in a coating material firstly and then subjecting the head to a constant force by using centrifugal force, thereby removing the coating material from the drive socket of the head. If the drive socket is in a form of a deep cavity, it is common that the coating material is not completely removed from the socket portion, with the result that the unremoved coating material becomes a residual coating. Then, after a baking process is executed, the baking process solidifies the residual coating, and the solidified residual coating is easily accumulated in the socket portion, especially accumulated in the drive regions formed around the drive socket. This accumulation is deemed to be a blocking phenomenon. Owing to the six engagement points and the insertion of the driver within reach of the conical bottom, the blocking phenomenon renders the driver unable to be firmly engaged with the socket portion. The improper accumulation of the residual coating also causes an uneven surface easily, which, however, impinges on the contact relationship between the driver and the interior of the screw head, such as the drive socket and the drive regions. Thus, the torque is not efficiently delivered to the head, and the improvement is required.

SUMMARY OF THE INVENTION

An object of this invention is to provide a drive configuration formed on a fastening assembly which includes two working units. The drive configuration assists the working units in engaging with each other by using multiple engagement points, thereby attaining a stable engagement of the working units, attaining an efficient delivery of drive force, and allowing a one-handed operating mode for ease of use.

A drive configuration of this invention is as defined in claim 1. The drive configuration is formed on a fastening assembly. The fastening assembly includes a first working unit, a second working unit adapted to engage with or separate from the first working unit, a bearing surface driven by torque, and a socket recessedly formed in the bearing surface. A screw is defined as the first working unit, and a driving tool is defined as the second working unit. The bearing surface serves as a top surface of a head of the screw. The socket includes a bottom portion distal from the bearing surface and an entrance portion joined to the bearing surface. The driving tool includes an end portion adapted to be inserted into the socket. The drive configuration defines a central axis axially applied to the fastening assembly. Furthermore, the drive configuration includes a plurality of operating regions and a plurality of engagement regions formed between the bottom portion and the entrance portion of the head and also includes a plurality of driving regions and a plurality of fitting regions formed on the driving tool. Each engagement region is extended between every two adjacent operating regions. Each fitting region is extended between every two adjacent driving regions.

Either the engagement region or the fitting engagement has a three-section arc structure. For example, when the engagement region of the screw has the three-section arc structure, it is required that the fitting region of the driving tool has a single arc wall provided with a single radius. It is also required that a surface of each operating region of the screw includes a base wall, a first socket side wall formed on a first side of the base wall, and a second socket side wall formed on a second side of the base wall, and that a surface of each engagement region of the screw includes a main arc wall provided with a radius, a first engagement arc wall connected to a first side of the main arc wall and extended to an adjacent first socket side wall, and a second engagement arc wall connected to a second side of the main arc wall and extended to an adjacent second socket side wall. The first engagement arc wall has a radius, and the second engagement arc wall has a radius. The radius of the first engagement arc wall is equal to the radius of the second engagement arc wall. The radius of the main arc wall is different from the radius of the first engagement arc wall and the radius of the second engagement arc wall. A first distance defined from the main arc wall to the central axis is shorter than a second distance defined from the base wall to the central axis. Alternatively, when the fitting region of the driving tool has the three-section arc structure, it is required that the engagement region of the screw has a single arc wall provided with a single radius. It is also required that a surface of each driving region of the driving tool includes a drive wall, a first drive side wall formed on a first side of the drive wall, and a second drive side wall formed on a second side of the drive wall, and that a surface of each fitting region includes a core arc wall provided with a radius, a first fitting arc wall connected to a first side of the core arc wall and extended to an adjacent first drive side wall, and a second fitting arc wall connected to a second side of the core arc wall and extended to an adjacent second drive side wall. The first fitting arc wall has a radius, and the second fitting arc wall has a radius. The radius of the first fitting arc wall is equal to the radius of the second fitting arc wall. The radius of the core arc wall is different from the radius of the first fitting arc wall and the radius of the second fitting arc wall. A third distance defined from the core arc wall to the central axis is shorter than a fourth distance defined from the drive wall to the central axis.

According to a whole arrangement which includes a three-section arc structure adopted by one working unit and a single arc wall adopted by the other working unit, this invention takes advantages of two arc walls of each three-section arc structure to come into contact with each single arc wall. This contact causes an interference effect, so each engagement region intersects with and engages with each fitting region to create two engagement points whereby a two-point fixing state is presented. By comparison with the six engagement points of the prior art, the number of the engagement points of this invention can be greatly increased because of the whole arrangement, thereby attaining a multi-point engaging effect. Even though a one-handed operating mode is adopted, the stable engagement of the two working units still remains unchanged. As to the whole arrangement, choosing the location of the engagement points depends on the depth of the socket. In other words, a location where each engagement region engages with each fitting region can be situated at the entrance portion of the socket, at the bottom portion of the socket, or between the bottom portion and the entrance portion, and this feature differs from the prior art which is mainly applied to the aforementioned deep cavity and only allows the insertion of the driver within the reach of the conical bottom. Even though a blocking phenomenon exists, the drive configuration as a whole still provides multiple engagement points. Owing to the multiple engagement points, torque is efficiently applied to the socket, and the fastening assembly is steadily driven to execute a stable drilling operation.

DETAILED DESCRIPTION OF THE PREFERRED EMBODIMENTS

Figure 1:
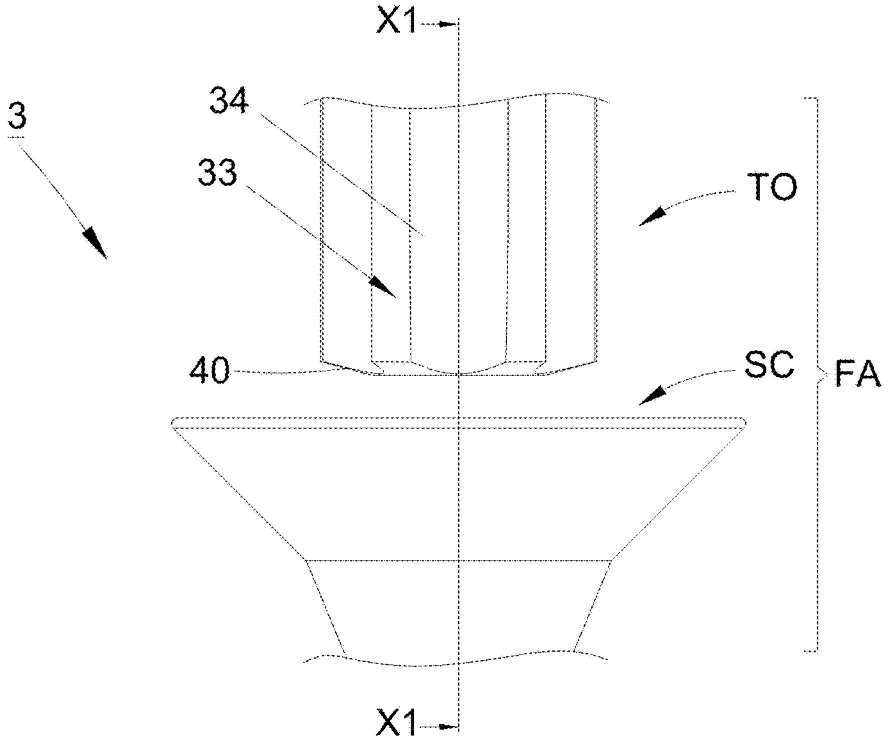
FIG. 1 is a schematic view showing a first preferred embodiment of this invention.

Referring to FIG. 1 through FIG. 4, a first preferred embodiment of a drive configuration 3 is shown. The drive configuration 3 is formed on a fastening assembly FA and defines a central axis R0. The central axis R0 is axially defined and applied to the fastening assembly FA. The fastening assembly FA is a combination of elements configured to execute a drilling operation. The fastening assembly FA includes a first working unit and a second working unit adapted to engage with or separate from the first working unit. When a screw SC is defined as the first working unit, a driving tool TO is defined as the second working unit capable of applying torque to the screw SC. The screw SC includes a head 30, and the head 30 includes a bearing surface 301 driven by the torque and a socket 302 recessedly formed in the bearing surface 301. The bearing surface 301 serves as a top surface of the head 30. The socket 302 includes an entrance portion 302*b* joined to the bearing surface 301 and a bottom portion 302*a* distal from the bearing surface 301, that is, far away from the bearing surface 301. In short, the bottom portion 302*a* and the entrance portion 302*b* are in opposite directions. The driving tool TO includes an end portion 40 capable of being inserted into the socket 302.

The drive configuration 3 includes a plurality of operating regions 31, a plurality of engagement regions 32, a plurality of driving regions 33, and a plurality of fitting regions 34, and herein take, for example, six operating regions 31, six engagement regions 32, six driving regions 33, and six fitting regions 34 shown in the preferred embodiments of this invention. Furthermore, the operating regions 31 and the engagement regions 32 are formed in the screw SC, and the driving regions 33 and the fitting regions 34 are formed on an outer periphery of the driving tool TO. Accordingly, six operating regions 31 which serve as external lobes alternate with six engagement regions 32 which serve as internal lobes, so a hexalobular socket is shown. Six driving regions 33 which serve as protrusions alternate with six fitting regions 34 which serve as recesses, so a tool having a convex-concave arrangement is shown.

Figure 4:
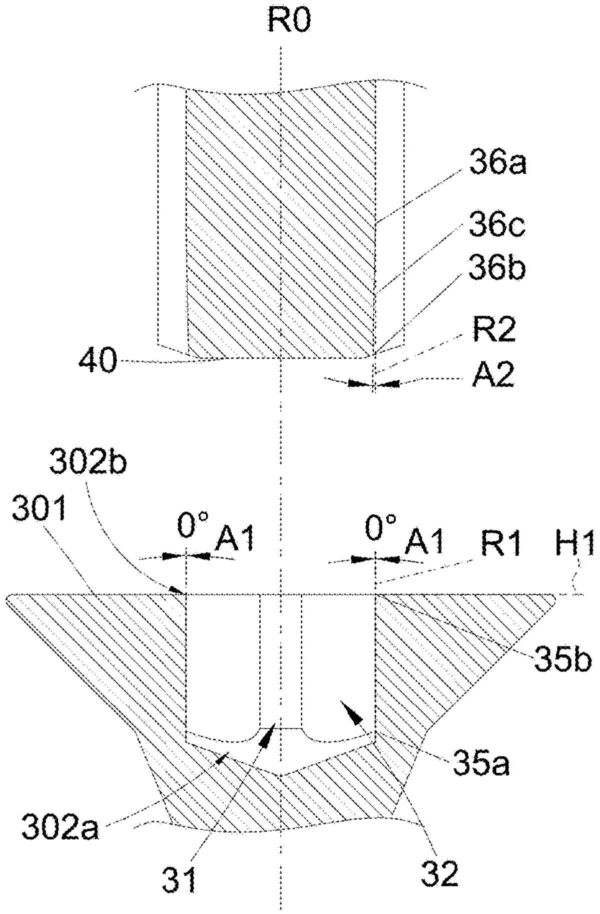
FIG. 4 is a cross-sectional view taken along X1-X1 line of FIG. 1.

Specifically, the operating regions 31 alternate with the engagement regions 32, so each engagement region 32 is extended between every two adjacent operation regions 31. The driving regions 33 alternate with the fitting regions 34, so each fitting region 34 is extended between every two adjacent driving regions 33. Regarding the driving tool TO, each fitting region 34 has a single arc wall, and a single radius is defined for the single arc wall. Referring to FIG. 4, the fitting region 34 defines a second end point 36*b* and a second base point 36*a* situated in opposite directions. Specifically, the second end point 36*b* is located at the end portion 40, and the second base point 36*a* is in opposing relationship to the second end point 36*b*. An engaging section 36*c* is extended from the second base point 36*a* to the second end point 36*b*. The second base point 36*a* defines a second baseline R2 parallel to the central axis R0. The extension of the engaging section 36*c* deviates from the second baseline R2 by a second angle A2 and directed towards the central axis R0.

The operating regions 31 and the engagement regions 32 are formed between the bearing surface 301 of the head 30 and the bottom portion 302*a* of the socket 302. Each engagement region 32 defines a first base point 35*a* and a first end point 35*b* situated in opposite directions. Specifically, the first base point 35*a* is located near the bottom portion 302*a*, and the first end point 35*b* is in opposing relationship to the first base point 35*a*. The first base point 35*a* defines a first baseline R1 parallel to the central axis R0. The first end point 35*b* can be defined at the entrance portion 302*b* and joined to the bearing surface 301. The engagement region 32 is extended from the first base point 35*a* to the first end point 35*b*. The extension of the engagement region 32 deviates from the first baseline R1 by a first angle A1 and directed in a direction opposite to the central axis R0.

Figure 5:
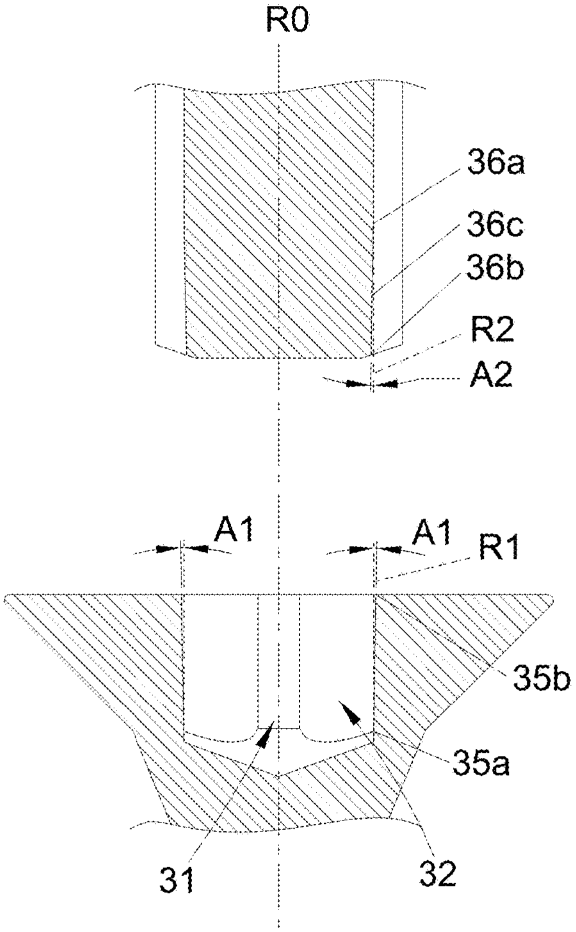
FIG. 5 is a cross-sectional view showing one variant of FIG. 4.
Figure 6:
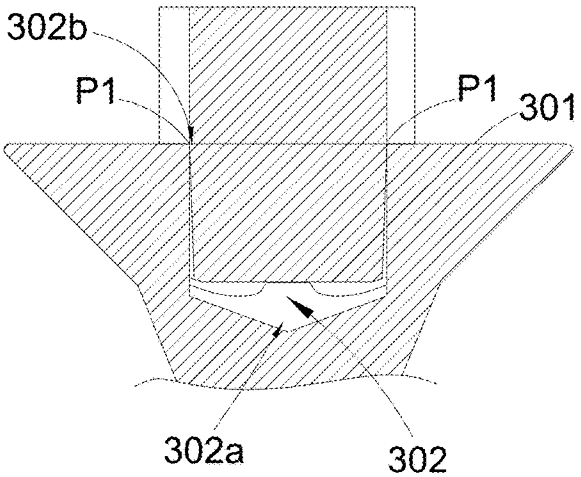
FIG. 6 is a schematic view showing the first preferred embodiment in use.

Furthermore, the depth of the socket 302 is relevant to the occurrence of the blocking phenomenon caused by the accumulation of the residual coating. For example, if the socket 302 is a deep cavity which has a longer distance from top to bottom, the blocking phenomenon is easily incurred at the bottom of the operating regions 31. If the socket 302 is a shallow cavity which has a shorter distance from top to bottom, the blocking phenomenon is not easily incurred at the bottom of the operating regions 31. Accordingly, the comparison between the angles A1, A2 depends on the depth of the socket 302. In other words, the first angle A1 can be smaller than, greater than, or equal to the second angle A2. A first scenario is that the first angle A1 is smaller than the second angle A2. In the first scenario, when the second angle A2, preferably, ranges from 1 to 3 degrees, the extension of the engaging section 36*c* does not go along the second baseline R2, with the result that the fitting region 34 of the driving tool TO is inclined inwardly towards the central axis R0. It is possible that the first angle A1 of the head 30 is 0 degree so that the engagement region 32 can be in a vertical form, which means that the engagement region 32 is perpendicular to a horizontal baseline H1 which can be defined by the bearing surface 301 and perpendicular to the central axis R0, as for example shown in FIG. 4. Alternatively, when the first angle A1 is greater than 0 degree, preferably from 1 to 3 degrees, the extension of the engagement region 32 does not go along the first baseline R1. In this case, a surface of the engagement region 32 deviates from the first baseline R1 by 1 to 3 degrees, so the engagement region 32 of the head 30 is inclined outwards, as for example shown in FIG. 5, and the aforementioned surface can be a first engagement arc wall 322 and a second engagement arc wall 323 which will be described as follows. According to the above, the location where the driving tool TO engages with the head 30 is situated at the entrance portion 302*b* of the socket 302. Therefore, the first scenario can be applied to the socket 302 with a longer distance. In the first preferred embodiment, take the engagement region 32 which is in a vertical form as an example, and the operation of this embodiment will more particularly described, by way of example, with reference to the accompanying drawings, such as FIG. 6, FIG. 6*a*, and FIG. 6*b*.

Figure 7A:
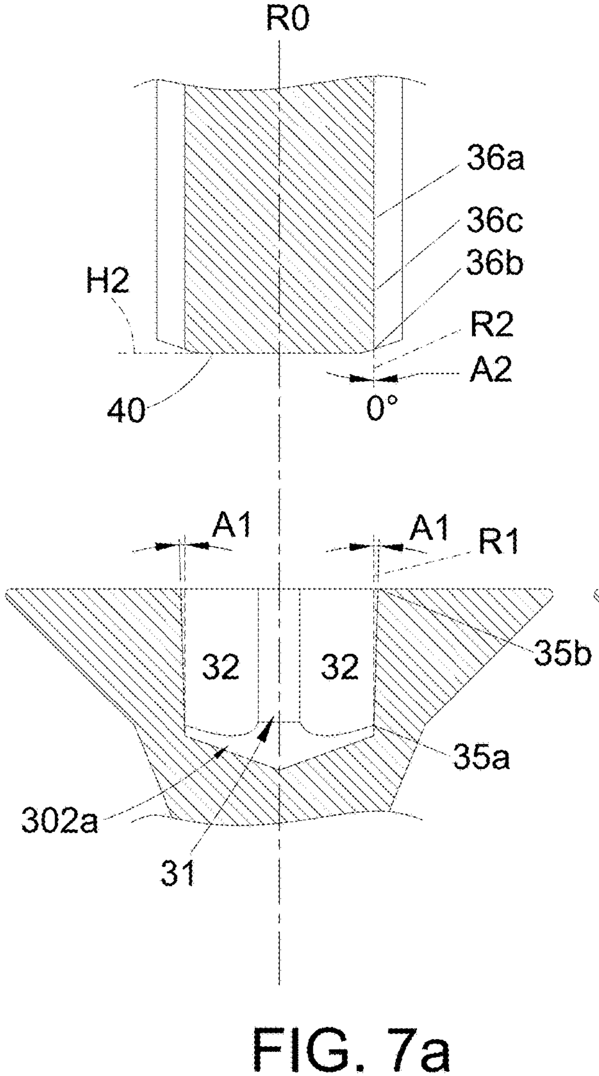
FIGS. 7*a* to 7*d* are schematic views showing variants of the first preferred embodiment, respectively.
Figure 7B:
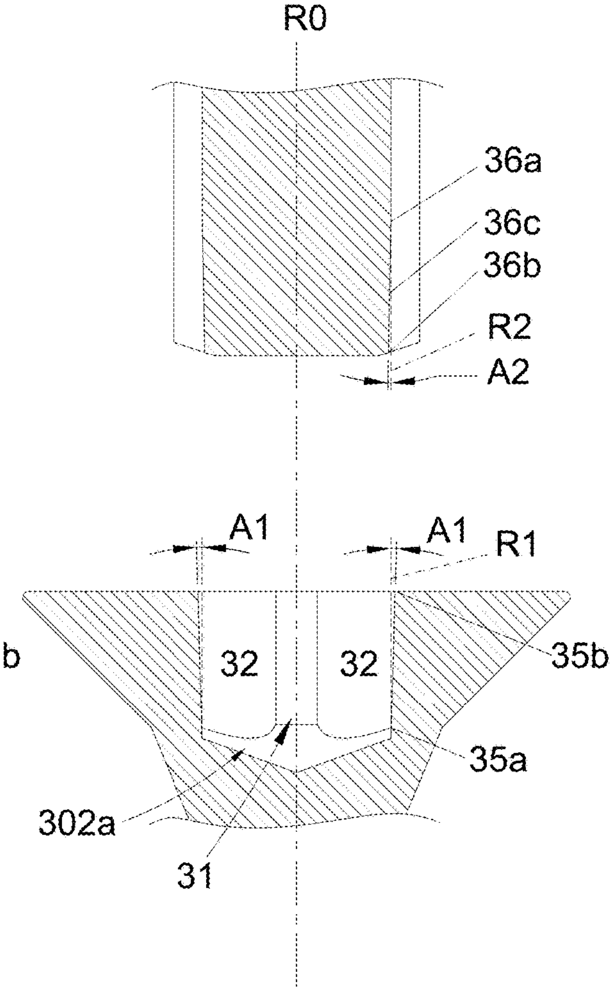

A second scenario is that the first angle A1 is greater than the second angle A2. In the second scenario, the engagement region 32 of the head 30 is inclined outwards when the first angle A1 is greater than 0 degree, preferably from 1 to 3 degrees, and the second angle A2 related to the extension of the engaging section 36*c* is 0 degree so that the fitting region 34 can be in a vertical form, which means that the fitting region 34 is perpendicular to a horizontal baseline H2 which can be defined by the end portion 40 and perpendicular to the central axis R0, as for example shown in FIG. 7*a*. Alternatively, the fitting region 34 of the driving tool TO is inwardly inclined when the second angle A2 is greater than 0 degree, preferably from 1 to 3 degrees, as for example shown in FIG. 7*b*. In this case, the location where the driving tool TO engages with the head 30 is situated at the bottom portion 302*b* of the socket 302. Therefore, the second scenario can be applied to the socket 302 with a shorter distance.

Figure 7C:
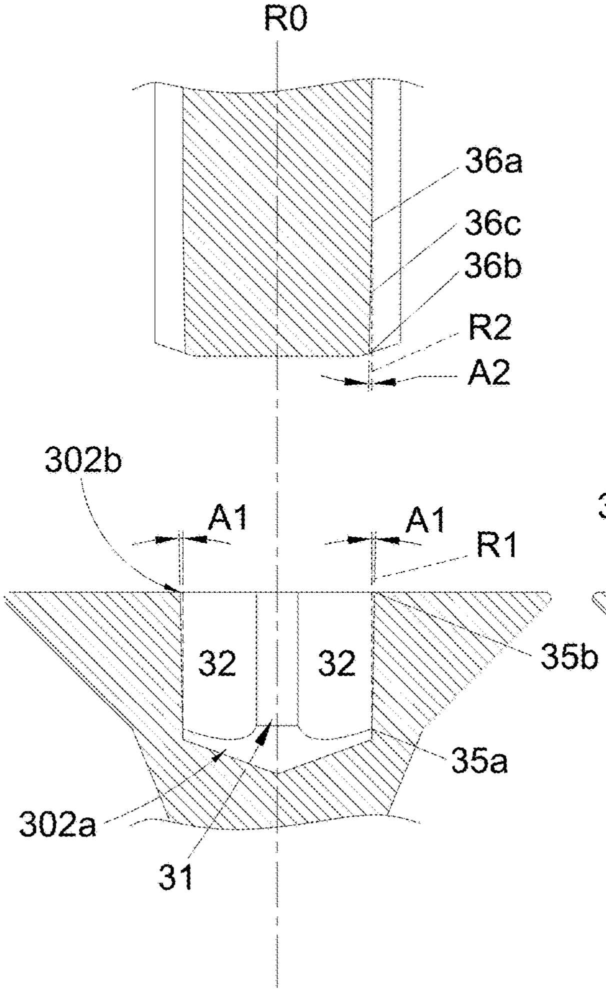
Figure 7D:
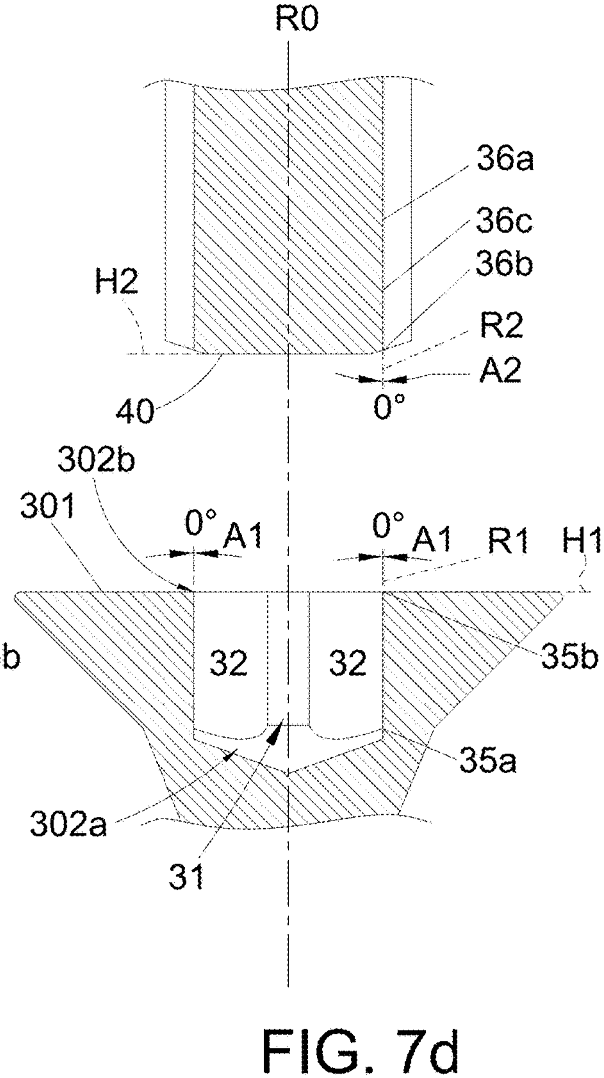
Figure 8:
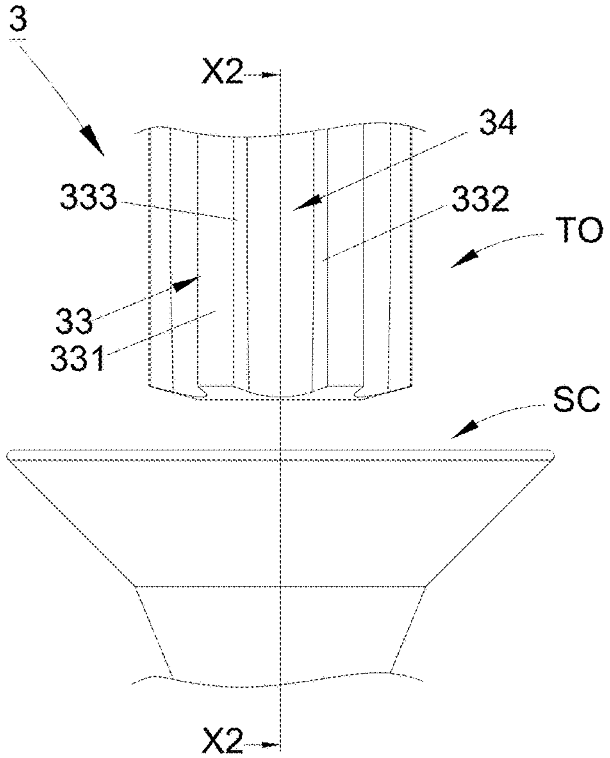
FIG. 8 is a schematic view showing a second preferred embodiment of this invention.

A third scenario is that the first angle A1 is equal to the second angle A2. In the third scenario, the engagement region 32 of the head 30 is inclined outwards when the first angle A1 is greater than 0 degree, preferably from 1 to 3 degrees, and the fitting region 34 of the driving tool TO is inwardly inclined when the second angle A2 is greater than 0 degree, preferably from 1 to 3 degrees. Meanwhile, the first angle A1 is equal to the second angle A2, as for example shown in FIG. 7*c*. Alternatively, both of the first angle A1 and the second angle A2 are 0 degree to be in a vertical form, as for example shown in FIG. 7*d*. In this case, the location where the driving tool TO engages with the head 30 is situated between the bottom portion 302*a* and the entrance portion 302*b*. Therefore, the third scenario can be applied to the socket 302 with a shorter distance.

Figure 2:
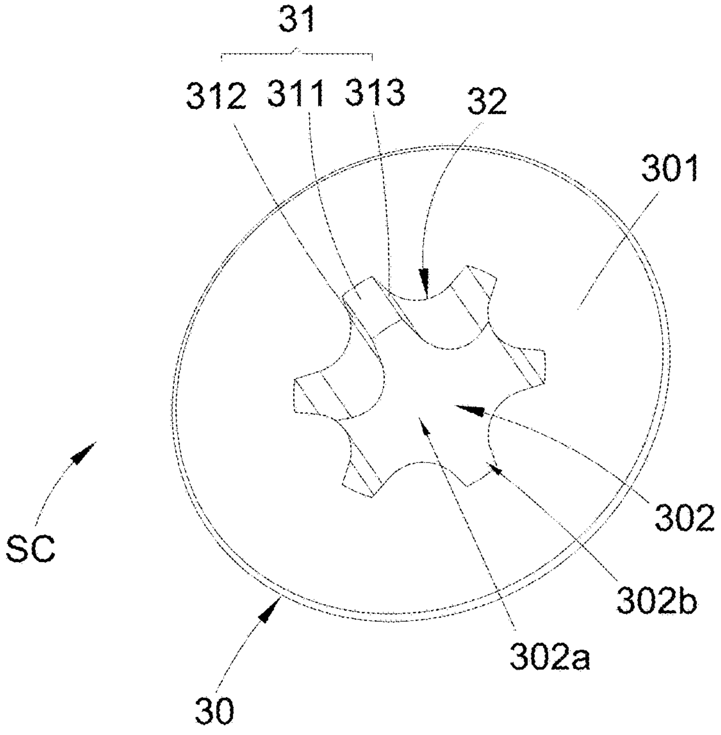
FIG. 2 is a perspective view showing a head of a screw of the first preferred embodiment.
Figure 3:
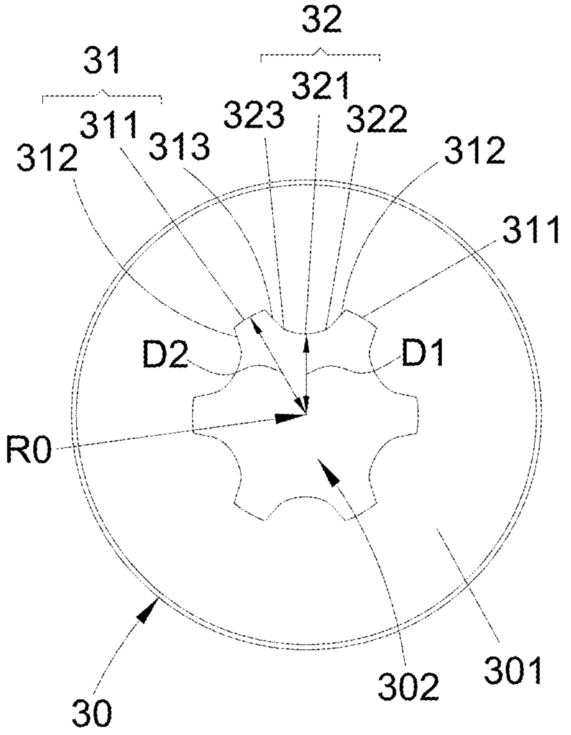
FIG. 3 is a top plan view of FIG. 2.
Figure 3A:
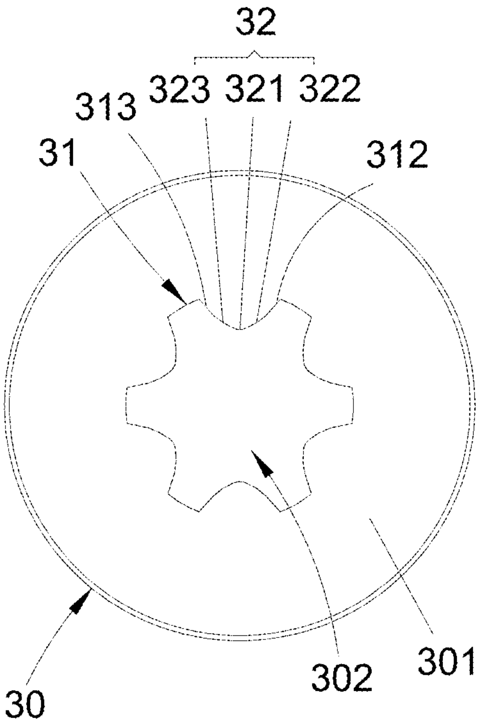
FIG. 3*a* is a top plan view showing one variant of FIG. 3.

FIG. 2 and FIG. 3 show the head 30 of the screw SC. A surface of each operating region 31 includes a base wall 311, a first socket side wall 312 formed on a first side of the base wall 311, and a second socket side wall 313 formed on a second side of the base wall 311. A surface of each engagement region 32 includes a main arc wall 321 provided with a radius, a first engagement arc wall 322 connected to a first side of the main arc wall 321 and provided with a radius, and a second engagement arc wall 323 connected to a second side of the main arc wall 321 and provided with a radius. The aforementioned first base point 35*a* can be defined by any one of the arc walls of the engagement region 32. As to every two adjacent operating regions 31, the first engagement arc wall 322 is extended to the first socket side wall 312 of one operating region 31, and the second engagement arc wall 323 is extended to the second socket side wall 313 of the other adjacent operating region 31. In addition, the aforementioned radii can be respectively defined to form respective arc walls 321, 322, 323. The radius of the first engagement arc wall 322 is equal to the radius of the second engagement arc wall 323. The radius of the main arc wall 321 is different from the radius of the first engagement arc wall 322 and the radius of the second engagement arc wall 323. For example, FIG. 3 shows that the radius of the main arc wall 321 is greater than the radius of the first engagement arc wall 322 and the radius of the second engagement arc wall 323, whereas FIG. 3*a* shows that the radius of the main arc wall 321 is smaller than the radius of the first engagement arc wall 322 and the radius of the second engagement arc wall 323. In the first preferred embodiment, the feature shown by FIG. 3 is described as an example. According to the above, each engagement region 32 has a three-section arc structure. Furthermore, a first distance D1 defined from the main arc wall 321 to the central axis R0 is shorter than a second distance D2 defined from the base wall 311 to the central axis R0. In the first preferred embodiment which shows a hexalobular socket, these engagement regions 32 can be in the form of six internal lobes formed in the head 30 because of the shorter first distance D1, and each internal lobe has the three-section arc structure to act as an engaging means. These operating regions 31 can be in the form of six external lobes because of the longer second distance D2, which receives torque delivered by the driving tool TO for rotating the head 30.

The operation of the first preferred embodiment is described with the aid of FIG. 1 through FIG. 6. The driving tool TO is inserted into the socket 302 of the head 30 so that the first working unit (namely the screw SC) can combine with the second working unit (namely the driving tool TO). Owing to the inward inclination caused by the second angle A2, the engaging section 36*c* of the driving tool TO is easily put into the socket 302 at the beginning of the insertion. After a length of the driving tool TO enters the socket 302, each operating region 31 of the head 30 meets each driving region 33 of the driving tool TO. Meanwhile, the condition that the first angle A1 is smaller than the second tool A2 cooperates with the condition that the first engagement arc wall 322 and the second engagement arc wall 323 are equal in radius. This cooperation allows the first engagement arc wall 322 and the second engagement arc wall 323 of each engagement region 32 of the head 30 to come into contact with the single arc wall of each fitting region 34 of the driving tool TO concurrently, and friction force is generated at the place where the contact occurs. Therefore, the two engagement arc walls 322, 323 interfere with the movement of the single arc wall of the fitting region 34, which allows each engagement region 32 to intersect with and engage with each fitting region 34, and when the engagement is made, two engagement points P1 are created at the intersection, that is, the place where each engagement region 32 meets each fitting region 34. The two engagement points P1 presents a two-point fixing state shown in FIG. 6 and FIG. 6*b*. Meanwhile, the location where each engagement region 32 is engaged with each fitting region 34 is situated at the entrance portion 302*b* of the socket 302. In short, the two engagement points P1 are located at the entrance portion 302*b*, that is, the place where the socket 302 meets the bearing surface 301.

Figure 6A:
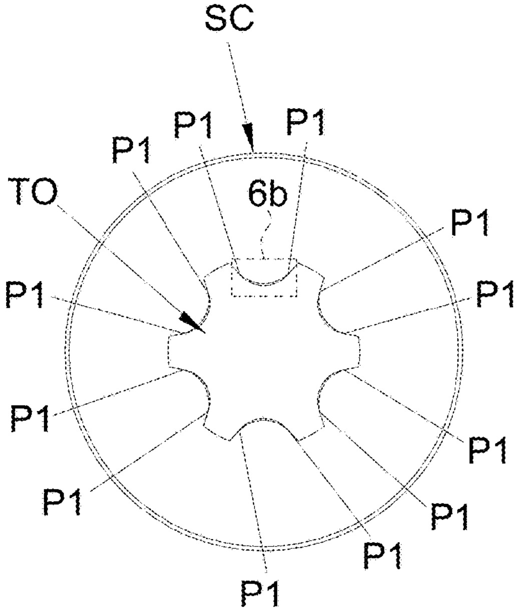
FIG. 6*a* is a top plan view of FIG. 6.
Figure 6B:
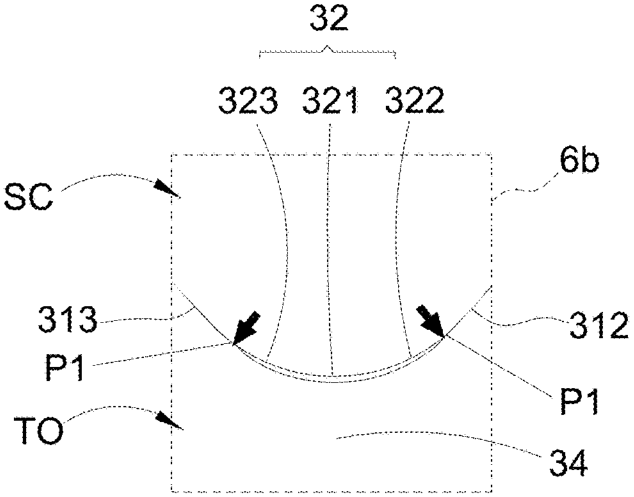
FIG. 6*b* is an enlarged view showing an encircled portion 6*b* of FIG. 6*a;*

When there are six engagement regions 32 and six fitting regions 34, multiple engagement points P1 are created between the engagement regions 32 of the screw SC and the fitting regions 34 of the driving tool TO. For example, FIG. 6*a* shows twelve engagement points P1 in total. As to the engagement occurring between the screw SC and the driving tool TO, the hardness of the driving tool TO is higher than the hardness of the screw SC, with the result that the insertion of the driving tool TO applies an action force on the head 30 and causes plastic deformation to occur in the engagement regions 32 of the socket 302. For this action force, there exists a reaction force opposite in direction. The existence of the reaction force, shown by thick arrows in FIG. 6*b*, allows each engagement point P1 to clamp the fitting region 34 so that the driving tool TO can be held in position, thereby attaining an engaging and fixing effect. Consequently, when the driving tool TO applies torque to rotate the screw SC, each engagement point P1 on the engagement region 32 generates plastic deformation to a certain extent along with the rotation, and the driving tool TO and the head 30 are stably engaged with each other during the rotation. By comparison with the six engagement points of the prior art, the multiple engagement points P1 of this invention provide a more stable engagement, which prevents the driving tool TO from escaping from the socket 302 of the head 30 easily and fulfills a stable combination. The multiple engagement points P1 also allow a user to engage the driving tool TO with the socket 302 by using one hand, and the stable combination is still maintained in the one-handed operating mode. Thus, the one-handed operation mode is attained for ease of use.

According to the above, multiple engagement points P1 are created by the engagement between the engagement regions 32 and the fitting regions 34, and the location of the engagement points P1 is situated at the entrance portion 302*b*. There is no need to engage the driving tool TO with the bottom portion 302*a* of the socket 302, and thus the driving tool TO can be inserted into a socket 302 with a longer distance from top to bottom. Even though a blocking phenomenon is incurred by the accumulation of the residual coating at the operating regions 31, over than half of the twelve engagement points P1 still attain the engaging effect. In other words, more than seven engagement points P1 still work, so the blocking phenomenon does not decrease the combination between the driving tool TO and the head 30. Owing to the multi-point engaging effect, the driving regions 33 have a stable and substantive contact with the base walls 311, the first socket side walls 312, and the second socket side walls 313, which allows these socket side walls 312, 313 to be strong enough to bear drive force, that is, torque applied by the driving tool TO. Thus, the driving regions 33 deliver the torque to the bearing surface 301 and the socket 302 efficiently so that the head 30 can be rotated to execute an efficient drilling operation of the screw SC.

Regarding the second scenario that the first angle A1 of the screw SC is greater than the second angle A2 of the driving tool TO, each engagement region 32 still intersects with each fitting region 34 to create two engagement points P1 for engagement, and the location of the engagement points P1 is situated at the bottom portion 302*a* of the socket 302. Under the premise that the blocking phenomenon is not easily incurred in the socket 302 with a shorter distance from top to bottom, the driving tool TO of the second scenario can be inserted into the socket 302 with the shorter distance.

Regarding the third scenario that the first angle A1 is equal to the second angle A2, each first engagement arc wall 322 and each second engagement arc wall 323 of the head 30 can be in surface contact with each fitting region 34 of the driving tool TO. This double-surface contact also creates two engagement points P1, and the location of the engagement points P1 is situated between the bottom portion 302*a* and the entrance portion 302*b*. Under the premise that the blocking phenomenon is not easily incurred in the socket 302 with a shorter distance from top to bottom, the driving tool TO of the third scenario can be inserted into the socket 302 with the shorter distance.

Moreover, when a contact area where a tool meets an inner wall surface of a drive socket of a head is overlarge, excess friction force is easily incurred. The excess friction force causes a too tight engagement between the tool and the drive socket under the premise of no blocking phenomenon, and thus the user needs to separate the tool from the drive socket with much effort. If the tool in use is driven by a power mechanism, the too tight engagement may also cause the tool to escape from the power mechanism easily. Accordingly, the inconvenience of using the tool is caused. As to the drive configuration 3 of this invention, the head 30 uses the first engagement arc wall 322 and the second engagement arc wall 323 to engage with the single arc wall of each fitting region 34 of the driving tool TO and forms a two-point fixing state because of the engagement. Meanwhile, there is a space between the main arc wall 321 and the fitting region 34, and the existence of the space maintains a proper amount of friction force between the engagement region 32 and the fitting region 34 in the two-point fixing state. In this case, a stable engagement is still attained, but a too tight engagement is prevented. Accordingly, after the user finishes the drilling operation or when the user stops using the fastening assembly FA, the user can separate the driving tool TO from the socket 302 without much effort for attaining a labor-saving effect and for ease of use. On the whole, the two-point fixing state formed between each engagement region 32 and each fitting region 34 of the drive configuration 3 allows the fastening assembly FA as a whole to attain a stable combination and apply the drive force to the head 30 efficiently. The stable combination of the two working units of the fastening assembly FA can also be fulfilled with one hand to attain a one-handed operating mode. When the fastening assembly FA is not in use, the two working units are easily separated from each other for saving physical effort and for ease of use.

Referring to FIG. 8 through FIG. 11, a second preferred embodiment of the drive configuration 3 is shown. The drive configuration 3 still includes a plurality of operating regions 31 and a plurality of engagement regions 32 formed in a screw SC and also includes a plurality of driving regions 33 and a plurality of fitting regions 34 formed on a driving tool TO. As for example shown in FIG. 10, the screw SC defines a first angle A1, and the driving tool TO defines a second angle A2. The first angle A1 can be smaller than, greater than, or equal to the second angle A2, which depends on the depth of the socket 302. The above arrangement still attains a stable engagement between the driving tool TO and the head 30. Details of the first angle A1 and the second angle A2 are as mentioned above and herein are not repeated. In the second preferred embodiment, take the first scenario that the first angle A1 (0 degree) is smaller than the second angle A2 (from 1 to 3 degrees) as an example for describing the operation as follows.

Figure 9:
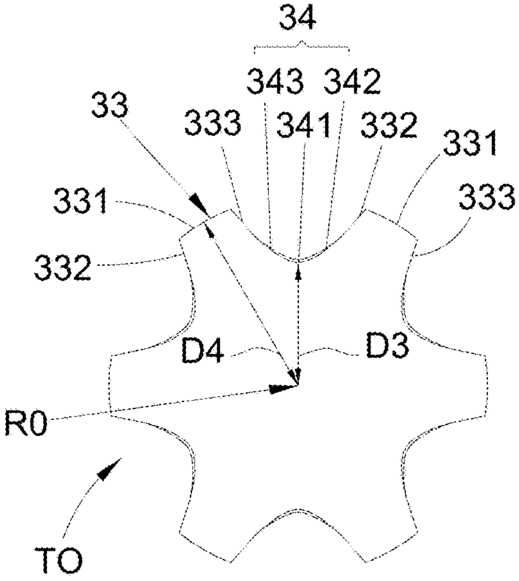
FIG. 9 is a schematic view showing an end portion of a driving tool of the second preferred embodiment.
Figure 9A:
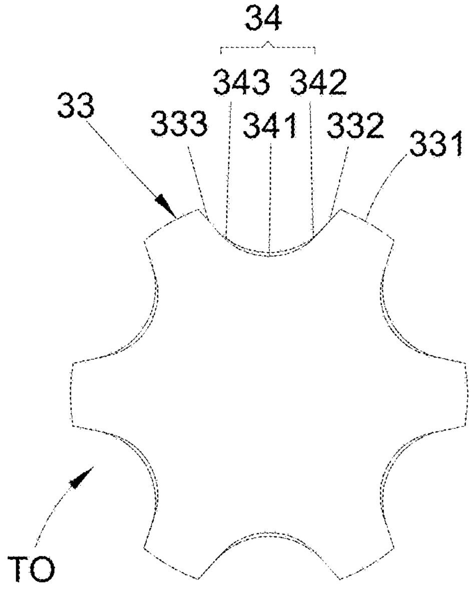
FIG. 9*a* is a schematic view showing one variant of FIG. 9.
Figure 10:
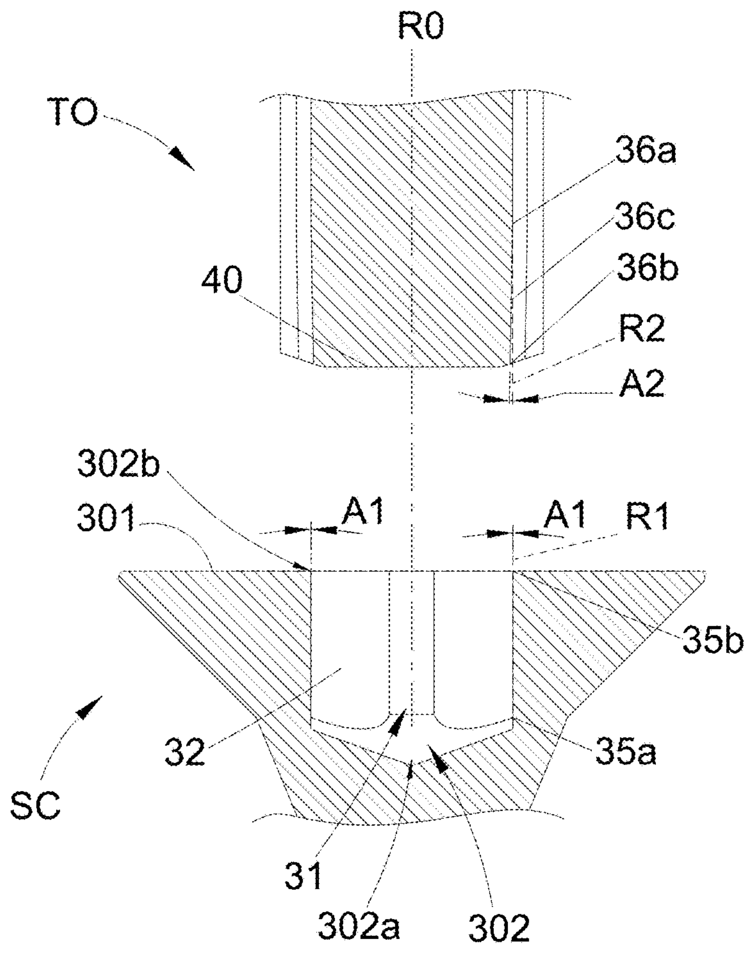
FIG. 10 is a cross-sectional view taken along X2-X2 line of FIG. 8.

The second preferred embodiment differs from the first preferred embodiment in some respects. In the second preferred embodiment, each engagement region 32 of the head 30 of the screw SC has a single arc wall with a single radius, and the driving tool TO includes a three-section arc structure. Referring to FIG. 9 and FIG. 10, a surface of each driving region 33 of the driving tool TO includes a drive wall 331, a first drive side wall 332 formed on a first side of the drive wall 331, and a second drive side wall 333 formed on a second side of the drive wall 331. The three-section arc structure is applied to the fitting regions 34. Specifically, a surface of each fitting region 34 includes a core arc wall 341 provided with a radius, a first fitting arc wall 342 connected to a first side of the core arc wall 341 and provided with a radius, and a second fitting arc wall 343 connected to a second side of the core arc wall 341 and provided with a radius. The aforementioned second base point 36*a* can be defined by any one of the arc walls of the fitting region 34. Furthermore, when the second angle A2 ranges from 1 to 3 degrees, the first fitting arc wall 342 and the second fitting arc wall 343 deviate from the second baseline R2 by 1 to 3 degrees respectively so that each fitting region 34 of the driving tool TO can possess an optimum inwardly-inclining arrangement. As to any two adjacent driving regions 33, the first fitting arc wall 342 is extended to the first drive side wall 332 of one driving region 33, and the second fitting arc wall 343 is extended to the second drive side wall 333 of the other adjacent driving region 33. In addition, the aforementioned radii can be respectively defined to form respective arc walls 341, 342, 343. The radius of the first fitting arc wall 342 is equal to the radius of the second fitting arc wall 343. The radius of the core arc wall 341 is different from the radius of the first fitting arc wall 342 and the radius of the second fitting arc wall 343. For example, FIG. 9 shows that the radius of the core arc wall 341 is smaller from the radius of the first fitting arc wall 342 and the radius of the second fitting arc wall 343, whereas FIG. 9*a* shows that the radius of the core arc wall 341 is greater from the radius of the first fitting arc wall 342 and the radius of the second fitting arc wall 343. In the second preferred embodiment, the feature shown by FIG. 9 is described as an example. Furthermore, a third distance D3 defined from the core arc wall 341 to the central axis R0 is shorter than a fourth distance D4 defined from the drive wall 331 to the central axis R0. Because of the shorter third distance D3, these fitting regions 34 can be in the form of multiple internal lobes which serve as recesses, as for example six recesses shown in the figures, and each internal lobe has the three-section arc structure to act as an engaging means. Because of the longer fourth distance D4, these driving regions 33 can be in the form of multiple external lobes which serve as protrusions, as for example six protrusions shown in the figures, for applying torque to the head 30.

Figure 11:
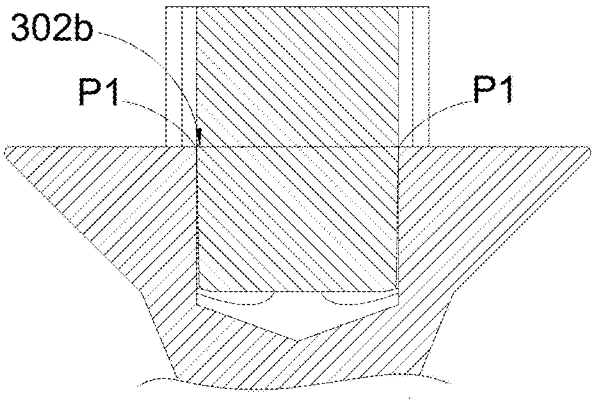
FIG. 11 is a schematic view showing the second preferred embodiment in use.
Figure 12:
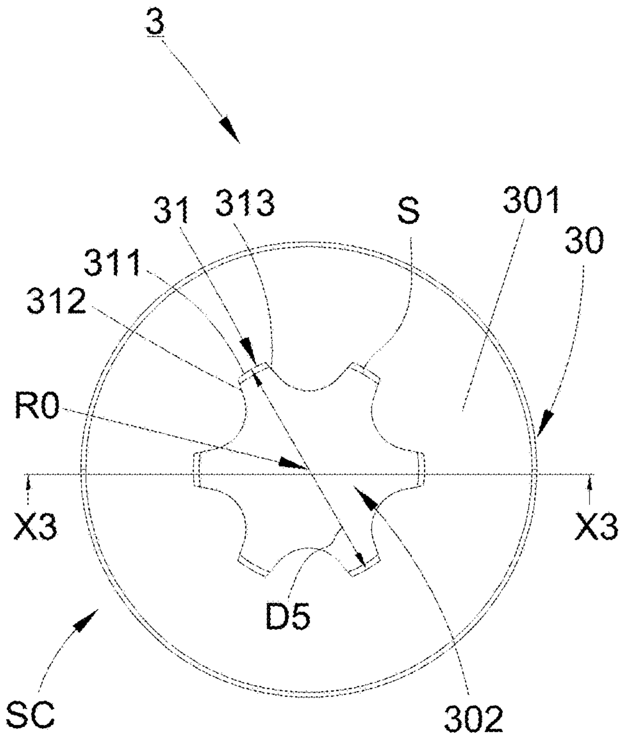
FIG. 12 is a top plan view showing a head of a screw of a third preferred embodiment of this invention.
Figure 13:
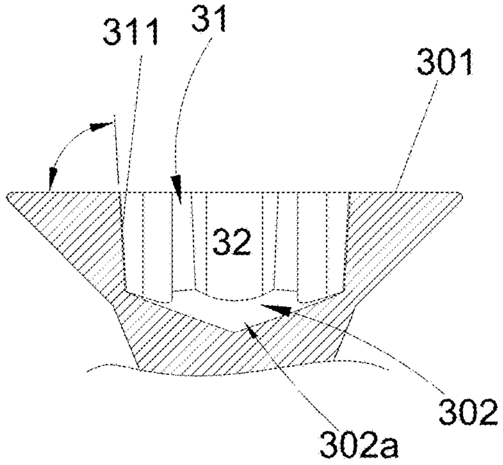
FIG. 13 is a cross-sectional view taken along X3-X3 line of FIG. 12.
Figure 14:
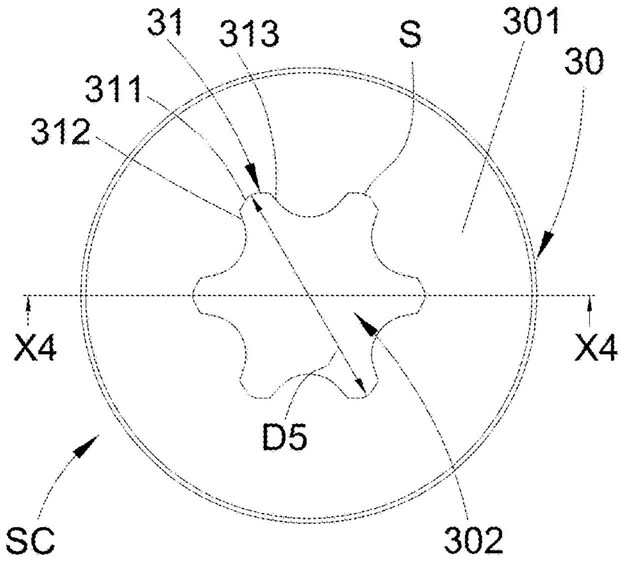
FIG. 14 is a top plan view showing another variant of the head of the screw of the third preferred embodiment.
Figure 15:
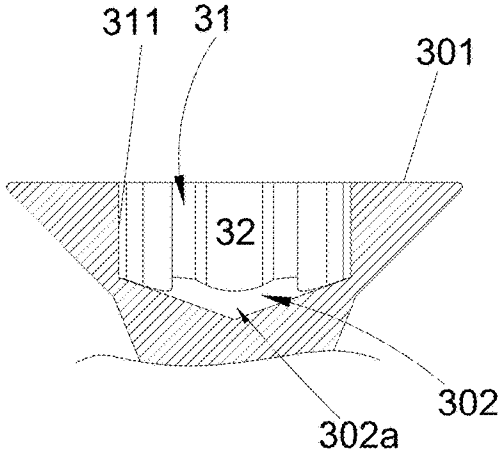
FIG. 15 is a cross-sectional view taken along X4-X4 line of FIG. 14.
Figure 16:
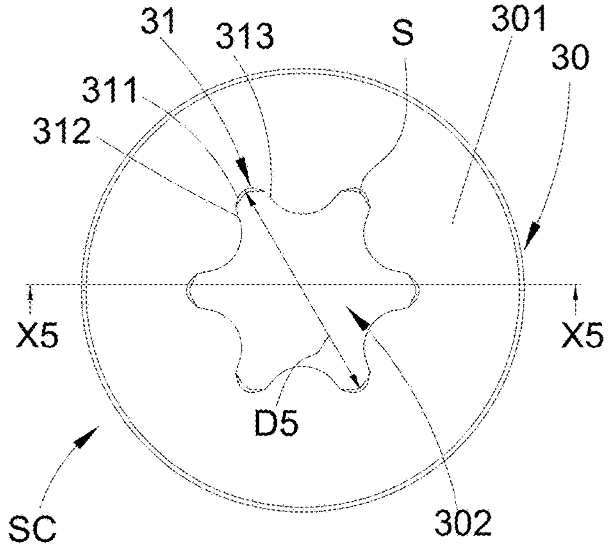
FIG. 16 is a top plan view showing a further variant of the head of the screw of the third preferred embodiment.
Figure 17:
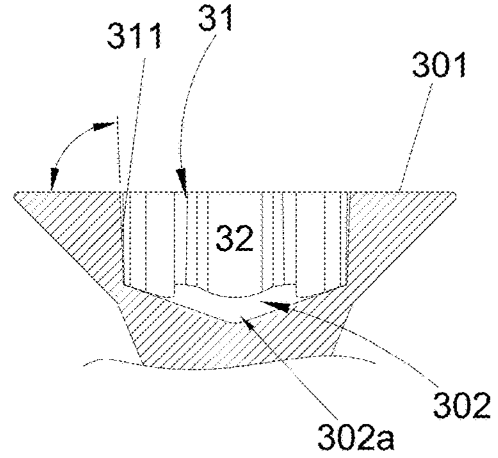
FIG. 17 is a cross-sectional view taken along X5-X5 line of FIG. 16.

According to the above, after the driving tool TO is inserted into the socket 302, each driving region 33 of the driving tool TO touches each operating region 31 of the head 30. Meanwhile, each first fitting arc wall 342 and each second fitting arc wall 343 of the driving tool TO can come into contact with the single arc wall of each engagement region 32 of the screw SC concurrently, and friction force can be generated at the place where the contact occurs. The friction force makes an interference which acts on the engagement between the screw SC and the driving tool TO, and the reaction force which exists along with the plastic deformation of the engagement region 32 also causes the engagement region 32 to clamp the fitting region 34. In this case, each engagement region 32 intersects with and engages with each fitting region 34, and the place where the regions 32, 34 meet creates two engagement points P1 when the engagement is made. The two engagement points P1 presents a two-point fixing state. The location where each engagement region 32 engages with each fitting region 34 is situated at the entrance portion 302*b* of the socket 302 in the two-point fixing state. In short, the two engagement points P1 are located at the entrance portion 302*b*, as shown in FIG. 11. On the whole, the operating regions 31 have a stable and substantive contact with the drive walls 331, the first drive side walls 332, and the second drive side walls 333, which allows the operating regions 31 to be strong enough to bear drive force, that is, torque applied by the driving tool TO. Thus, the driving regions 33 deliver the torque to the bearing surface 301 and the socket 302 efficiently so that the head 30 can be rotated to execute an efficient drilling operation.

There is a space between the core arc wall 341 and the engagement region 32 to maintain a proper amount of friction force between the engagement region 32 and the fitting region 34 in the two-point fixing state, which fulfills a stable engagement, prevents a too tight engagement, and attains an easy use. Therefore, the drive configuration 3 assists the fastening assembly FA in attaining a stable combination and applying the drive force to the head 30 efficiently. The stable combination of the two working units of the fastening assembly FA can also be fulfilled with one hand to attain a one-handed operating mode. When the fastening assembly FA is not in use, the two working units are easily separated from each other for attaining a labor-saving effect and for ease of use.

Figure 18:
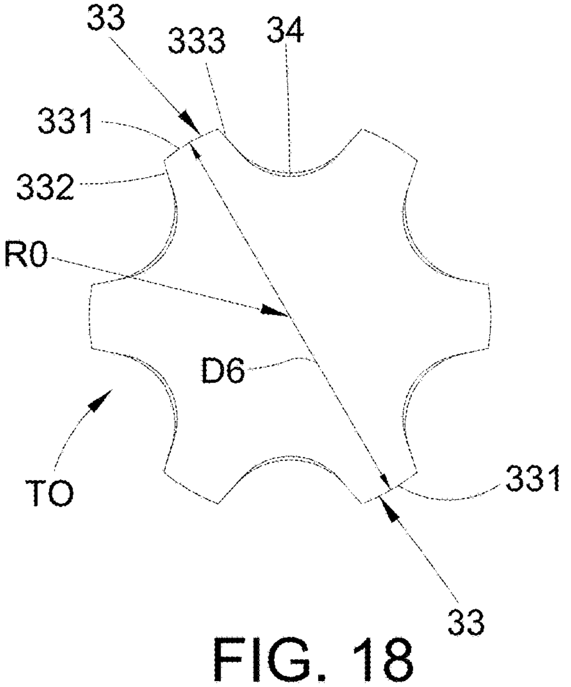
FIG. 18 is a schematic view showing an end portion of a driving tool applied to the third preferred embodiment, wherein the driving tool does not have a three-section arc structure.
Figure 19:
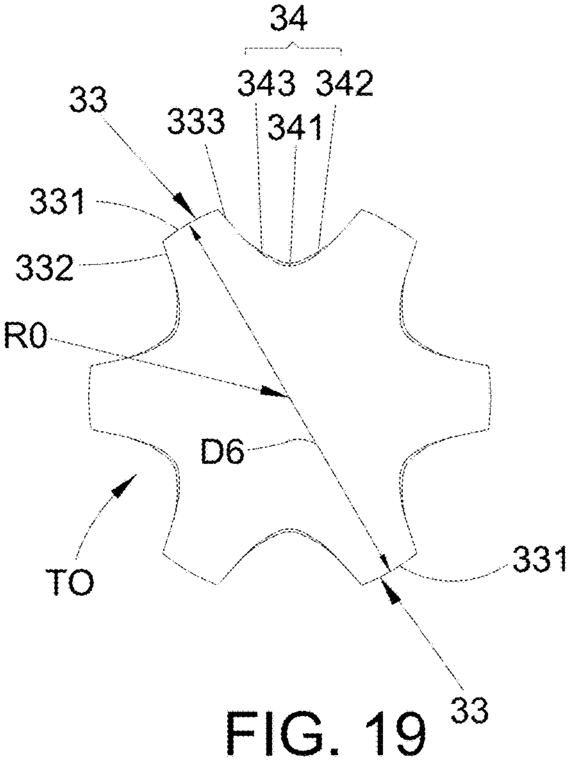
FIG. 19 is a schematic view showing an end portion of a driving tool applied to the third preferred embodiment, wherein the driving tool has a three-section arc structure.

Referring to FIG. 12 through FIG. 19, a third preferred embodiment of the drive configuration 3 is characterized in that a maximum outer diameter D5 is defined between every two opposite operating regions 31. The opposite operating regions 31 means nonadjacent operating regions 31 situated in opposite directions, that is, oriented in a diagonal position. The maximum outer diameter D5 is defined as a line from a top edge of the base wall 311 of one operating region 31 to a top edge of the base wall 311 of the other opposite operating region 31. Referring to FIG. 18 or FIG. 19, a main outer diameter D6 is defined between every two opposite driving regions 33. The opposite driving regions 33 means nonadjacent driving regions 33 situated in opposite directions, that is, oriented in a diagonal position. The main outer diameter D6 is defined as a line from the drive wall 331 of one driving region 33 to the drive wall 331 of the other opposite driving region 33. The maximum outer diameter D5 and the main outer diameter D6 pass through the central axis R0 respectively. The maximum outer diameter D5 is greater than the main outer diameter D6. Moreover, the base wall 311 of the screw SC can have various surfaces, such as, but not limited to, a sloping surface shown in FIG. 12 and FIG. 13, an arcuate surface shown in FIG. 14 and FIG. 15, and a sloping and arcuate surface shown in FIG. 16 and FIG. 17. These surfaces help enlarge an original outer diameter of the socket 302 for defining the maximum outer diameter D5, and each operating region 31 is expanded outwards when the maximum outer diameter D5 is defined. An accommodation space S is also formed because of the outward expansion. Owing to the outward expansion, the driving tool TO is easily put into the socket 302 and held in position, and the residual coating is allowed to be accumulated in the accommodation space S. Even though the residual coating is accumulated in the accommodation space S and then solidified by baking, the solidified coating is not easily adhered to the first socket side wall 312 and the second socket side wall 313 of each operating region 31 because of the outward expansion. Consequently, the blocking phenomenon caused by the accumulation of the residual coating does not affect the insertion of the driving tool TO.

The outward expansion can also be incorporated into the arrangements respectively disclosed in the first preferred embodiment and the second preferred embodiment, which means that the outward expansion cooperates with the three-section arc structure applied to each engagement region 32 or cooperates with the three-section arc structure applied to each fitting region 34. Owing to the multi-point engaging effect, the driving regions 33 have a stable and substantive contact with the base walls 311 of the operating regions 31, which allows the driving tool TO to apply torque to the bearing surface 301 and the socket 302 efficiently. Therefore, the drive configuration 3 as a whole allows the fastening assembly FA to attain a stable combination and an efficient delivery of the torque. Furthermore, the two working units of the fastening assembly FA can be operated with one hand for attaining a labor-saving effect and for ease of use.

To sum up, this invention discloses a drive configuration formed on a fastening assembly which includes a first working unit and a second working unit. The drive configuration features a three-section arc structure applied to each engagement region of the first working unit or applied to each fitting region of the second working unit. The drive configuration also features a single arc wall applied to one working unit which does not include the three-section arc structure. The three-section arc structure and the single arc wall coexist, so two engagement points are created when each engagement region intersects with and engages with each fitting region. The combination of the two working units means that the drive configuration as a whole provides multiple engagement points, which attains a stable combination and an efficient delivery of drive force and also allows a one-handed operating mode for ease of use.

While the embodiments are shown and described above, it is understood that further variants and modifications may be made without departing from the scope of this invention.

What is claimed is:

1. A fastening assembly comprising a drive configuration, said fastening assembly including:

a first working unit and a second working unit adapted to engage with or separate from said first working unit, with a screw defined as said first working unit and a driving tool defined as said second working unit, wherein said screw includes a head, a bearing surface formed on said head, and a socket recessedly formed in said bearing surface, said socket including a bottom portion distal from said bearing surface and an entrance portion joined to said bearing surface, said driving tool including an end portion adapted to be inserted into said socket; and said drive configuration defining a central axis axially applied to said fastening assembly and comprising a plurality of operating regions and a plurality of driving regions, a plurality of engagement regions being each extended between every two adjacent operating regions, said plurality of operating regions and said plurality of engagement regions being formed between said bottom portion and said bearing surface, a plurality of fitting regions being each extended between every two adjacent driving regions, said plurality of driving regions and said plurality of fitting regions being formed on an outer periphery of said driving tool;

wherein each said fitting region of said driving tool has a single arc wall provided with a single radius, a surface of each said operating region of said screw including a base wall, a first socket side wall formed on a first side of said base wall, and a second socket side wall formed on a second side of said base wall, a surface of each said engagement region including a main arc wall provided with a radius, a first engagement arc wall connected to a first side of said main arc wall, and a second engagement arc wall connected to a second side of said main arc wall, said first engagement arc wall being provided with a radius and extended to said first socket side wall of one operating region of said every two adjacent operating regions, said second engagement arc wall being provided with a radius and extended to said second socket side wall of the other operating region of said every two adjacent operating regions, said radius of said first engagement arc wall being equal to said radius of said second engagement arc wall, said radius of said main arc wall being different from said radius of said first engagement arc wall and said radius of said second engagement arc wall, each said engagement region of said screw thereby being in the form of a three-section arc structure, a first distance being defined from said main arc wall to said central axis, a second distance being defined from said base wall to said central axis, said first distance being shorter than said second distance; and wherein when said screw and said driving tool are engaged with each other, each said operating region of said screw touches each said driving region of said driving tool, and said first engagement arc wall and said second engagement arc wall of each said engagement region come into contact with each said fitting region of said driving tool, each said engagement region thereby intersecting with and engaging with each said fitting region to create two engagement points, thereby applying torque caused by said driving tool to said head efficiently.

2. The fastening assembly according to claim 1, wherein said radius of said main arc wall is greater than said radius of said first engagement arc wall and said radius of said second engagement arc wall.

3. The fastening assembly according to claim 1, wherein said radius of said main arc wall is smaller than said radius of said first engagement arc wall and said radius of said second engagement arc wall.

4. The fastening assembly according to claim 1, wherein each said engagement region defines a first base point near said bottom portion and a first end point in opposing relationship to said first base point, said first base point defining a first baseline parallel to said central axis, each said engagement region being extended from said first base point to said first end point, with the extension of said engagement region deviating from said first baseline by a first angle and directed in a direction opposite to said central axis, each said fitting region defining a second end point located at said end portion, a second base point in opposing relationship to said second end point, and an engaging section extended from said second base point to said second end point, said second base point defining a second baseline parallel to said central axis, with the extension of said engaging section deviating from said second baseline by a second angle and directed towards said central axis, said first angle being smaller than said second angle.

5. The fastening assembly according to claim 4, wherein said first angle is 0 degree, and said second angle ranges from 1 to 3 degrees to cause each said fitting region to be inwardly inclined.

6. The fastening assembly according to claim 4, wherein said first angle is greater than 0 degree to cause each said engagement region to be inclined outwards, and said second angle ranges from 1 to 3 degrees to cause each said fitting region to be inwardly inclined.

7. The fastening assembly according to claim 1, wherein each said engagement region defines a first base point near said bottom portion and a first end point in opposing relationship to said first base point, said first base point defining a first baseline parallel to said central axis, each said engagement region being extended from said first base point to said first end point, with the extension of said engagement region deviating from said first baseline by a first angle and directed in a direction opposite to said central axis, each said fitting region defining a second end point located at said end portion, a second base point in opposing relationship to said second end point, and an engaging section extended from said second base point to said second end point, said second base point defining a second baseline parallel to said central axis, with the extension of said engaging section deviating from said second baseline by a second angle and directed towards said central axis, said first angle being greater than said second angle.

8. The fastening assembly according to claim 1, wherein each said engagement region defines a first base point near said bottom portion and a first end point in opposing relationship to said first base point, said first base point defining a first baseline parallel to said central axis, each said engagement region being extended from said first base point to said first end point, with the extension of said engagement region deviating from said first baseline by a first angle and directed in a direction opposite to said central axis, each said fitting region defining a second end point located at said end portion, a second base point in opposing relationship to said second end point, and an engaging section extended from said second base point to said second end point, said second base point defining a second baseline parallel to said central axis, with the extension of said engaging section deviating from said second baseline by a second angle and directed towards said central axis, said first angle being equal to said second angle.

9. The fastening assembly according to claim 1, wherein a maximum outer diameter is defined between every two opposite operating regions oriented in a diagonal position, with said maximum outer diameter defined as a line from a top edge of said base wall of one operating region of said every two opposite operating regions to a top edge of said base wall of the other operating region of said every two opposite operating regions, a surface of said driving region including a drive wall, a first drive side wall formed on a first side of said drive wall, and a second drive side wall formed on a second side of said drive wall, a main outer diameter being defined between every two opposite driving regions oriented in a diagonal position, with said main outer diameter defined as a line from said drive wall of one driving region of said every two opposite driving regions to said drive wall of the other driving region of said every two opposite driving regions, said maximum outer diameter being greater than said main outer diameter.

10. A drive configuration adapted to be formed on a fastening assembly comprising a drive configuration, said fastening assembly including:

a first working unit and a second working unit adapted to engage with or separate from said first working unit, with a screw defined as said first working unit and a driving tool defined as said second working unit, wherein said screw includes a head, a bearing surface formed on said head, and a socket recessedly formed in said bearing surface, said socket including a bottom portion distal from said bearing surface and an entrance portion joined to said bearing surface, said driving tool including an end portion adapted to be inserted into said socket; and said drive configuration defining a central axis axially applied to said fastening assembly and comprising a plurality of operating regions and a plurality of driving regions, a plurality of engagement regions being each extended between every two adjacent operating regions, said plurality of operating regions and said plurality of engagement regions being formed between said bottom portion and said bearing surface, a plurality of fitting regions being each extended between every two adjacent driving regions, said plurality of driving regions and said plurality of fitting regions being formed on an outer periphery of said driving tool;

wherein each said engagement region of said screw has a single arc wall provided with a single radius, a surface of each said driving region of said driving tool including a drive wall, a first drive side wall formed on a first side of said drive wall, and a second drive side wall formed on a second side of said drive wall, a surface of each said fitting region including a core arc wall provided with a radius, a first fitting arc wall connected to a first side of said core arc wall, and a second fitting arc wall connected to a second side of said core arc wall, said first fitting arc wall being provided with a radius and extended to said first drive side wall of one driving region of said every two adjacent driving regions, said second fitting arc wall being provided with a radius and extended to said second drive side wall of the other driving region of said every two adjacent driving regions, said radius of said first fitting arc wall being equal to said radius of said second fitting arc wall, said radius of said core arc wall being different from said radius of said first fitting arc wall and said radius of said second fitting arc wall, and each said fitting region of said driving tool thereby being in the form of a three-section arc structure, a third distance being defined from said core arc wall to said central axis, a fourth distance being defined from said drive wall to said central axis, said third distance being shorter than said fourth distance; and wherein when said screw and said driving tool are engaged with each other, each said operating region of said screw touches each said driving region of said driving tool, and each said engagement region of said screw comes into contact with said first fitting arc wall and said second fitting arc wall of each said fitting region, each said engagement region thereby intersecting with and engaging with each said fitting region to create two engagement points, thereby applying torque caused by said driving tool to said head efficiently.

11. The fastening assembly according to claim 10, wherein said radius of said core arc wall is smaller than said radius of said first fitting arc wall and said radius of said second fitting arc wall.

12. The fastening assembly according to claim 10, wherein said radius of said core arc wall is greater than said radius of said first fitting arc wall and said radius of said second fitting arc wall.

13. The fastening assembly according to claim 10, wherein each said engagement region defines a first base point near said bottom portion and a first end point in opposing relationship to said first base point, said first base point defining a first baseline parallel to said central axis, each said engagement region being extended from said first base point to said first end point, with the extension of said engagement region deviating from said first baseline by a first angle and directed in a direction opposite to said central axis, each said fitting region defining a second end point located at said end portion, a second base point in opposing relationship to said second end point, and an engaging section extended from said second base point to said second end point, said second base point defining a second baseline parallel to said central axis, with the extension of said engaging section deviating from said second baseline by a second angle and directed towards said central axis, said first angle being smaller than said second angle.

14. The fastening assembly according to claim 13, wherein said first angle is 0 degree, and said second angle ranges from 1 to 3 degrees to cause each said fitting region to be inwardly inclined.

15. The fastening assembly according to claim 13, wherein said first angle is greater than 0 degree to cause each said engagement region to be inclined outwards, and said second angle ranges from 1 to 3 degrees to cause each said fitting region to be inwardly inclined.

16. The fastening assembly according to claim 10, wherein each said engagement region defines a first base point near said bottom portion and a first end point in opposing relationship to said first base point, said first base point defining a first baseline parallel to said central axis, each said engagement region being extended from said first base point to said first end point, with the extension of said engagement region deviating from said first baseline by a first angle and directed in a direction opposite to said central axis, each said fitting region defining a second end point located at said end portion, a second base point in opposing relationship to said second end point, and an engaging section extended from said second base point to said second end point, said second base point defining a second baseline parallel to said central axis, with the extension of said engaging section deviating from said second baseline by a second angle and directed towards said central axis, said first angle being greater than said second angle.

17. The fastening assembly according to claim 10, wherein each said engagement region defines a first base point near said bottom portion and a first end point in opposing relationship to said first base point, said first base point defining a first baseline parallel to said central axis, each said engagement region being extended from said first base point to said first end point, with the extension of said engagement region deviating from said first baseline by a first angle and directed in a direction opposite to said central axis, each said fitting region defining a second end point located at said end portion, a second base point in opposing relationship to said second end point, and an engaging section extended from said second base point to said second end point, said second base point defining a second baseline parallel to said central axis, with the extension of said engaging section deviating from said second baseline by a second angle and directed towards said central axis, said first angle being equal to said second angle.

18. The fastening assembly according to claim 10, wherein a surface of each said operating region of said screw includes a base wall, a first socket side wall formed on a first side of said base wall, and a second socket side wall formed on a second side of said base wall, a maximum outer diameter being defined between every two opposite operating regions oriented in a diagonal position, said maximum outer diameter being defined as a line from a top edge of said base wall of one operating region of said every two opposite operating regions to a top edge of said base wall of the other operating region of said every two opposite operating regions, a main outer diameter being defined between every two opposite driving regions oriented in a diagonal position, said main outer diameter being defined as a line from the drive wall of one driving region of said every two opposite driving regions to the drive wall of the other driving region of said every two opposite driving regions, said maximum outer diameter being greater than said main outer diameter.

* * * * *